United States Patent
Yoshida et al.

(10) Patent No.: US 7,694,536 B2
(45) Date of Patent: Apr. 13, 2010

(54) MANUFACTURING APPARATUS OF POROUS GLASS BASE MATERIAL AND GLASS BASE MATERIAL FOR OPTICAL FIBER

(75) Inventors: Makoto Yoshida, Ibaraki (JP); Takeshi Kamio, Ibaraki (JP)

(73) Assignee: Shin-Etsu Chemical Co., Ltd., Chiyoda-ku, Tokyo (JP)

(*) Notice: Subject to any disclaimer, the term of this patent is extended or adjusted under 35 U.S.C. 154(b) by 675 days.

(21) Appl. No.: 10/593,233

(22) PCT Filed: Mar. 9, 2005

(86) PCT No.: PCT/JP2005/004122
§ 371 (c)(1), (2), (4) Date: Oct. 12, 2006

(87) PCT Pub. No.: WO2005/090251
PCT Pub. Date: Sep. 29, 2005

(65) Prior Publication Data
US 2007/0256456 A1   Nov. 8, 2007

(30) Foreign Application Priority Data
Mar. 18, 2004 (JP) ............................. 2004-078211

(51) Int. Cl.
C03B 37/01 (2006.01)
C03B 37/00 (2006.01)
C03B 37/018 (2006.01)

(52) U.S. Cl. .............................. 65/508; 65/494; 65/507
(58) Field of Classification Search ............... 65/508, 65/385, 413, 414, 483, 494, 507; 428/542.8
See application file for complete search history.

(56) References Cited

U.S. PATENT DOCUMENTS

| | | | |
|---|---|---|---|
| 6,306,500 B1 * | 10/2001 | Kuwabara et al. ........... | 428/372 |
| 2002/0050154 A1 * | 5/2002 | Kase et al. ................ | 65/377 |
| 2003/0015004 A1 * | 1/2003 | Nakamura et al. .......... | 65/531 |
| 2004/0237594 A1 * | 12/2004 | Roba et al. ................ | 65/413 |
| 2005/0199014 A1 * | 9/2005 | Nakamura et al. .......... | 65/413 |
| 2007/0051135 A1 * | 3/2007 | Machida et al. ............. | 65/377 |

FOREIGN PATENT DOCUMENTS

JP    59-190232    10/1984

(Continued)

*Primary Examiner*—Eric Hug
*Assistant Examiner*—Cynthia Szewczyk
(74) *Attorney, Agent, or Firm*—McGinn Intellectual Property Law Group, PLLC (57) ABSTRACT

A manufacturing apparatus of a porous glass base material is provided. The manufacturing apparatus includes a burner repeatedly moving back and forthreciprocating in a direction along a longitudinal direction of an axis-rotating base member glass rod, where the burner ejects and deposits glass particles onto the base member glass rod, and an exhaust hood positioned above a porous glass soot formed by the deposition of the glass particles, where the exhaust hood repeatedly moves back and forth reciprocates in a same direction as the burner in synchronization with the burner. Here, the exhaust hood surrounds a portion of the porous glass soot corresponding to an angle θ of 100° or more with respect to an axial centera central axis of the porous glass soot. To be more specific, the angle θ may be preferably 180° or more.

13 Claims, 6 Drawing Sheets

FOREIGN PATENT DOCUMENTS

| | | |
|---|---|---|
| JP | 2-131533 | 11/1990 |
| JP | 04275937 A * | 10/1992 |
| JP | 04275938 A * | 10/1992 |
| JP | 7-101745 | 4/1995 |
| JP | 2001-19463 | 1/2001 |

* cited by examiner

FIG. 1

PRIOR ART

FIG. 2

PRIOR ART

MANUFACTURING APPARATUS OF POROUS GLASS BASE MATERIAL AND GLASS BASE MATERIAL FOR OPTICAL FIBER

TECHNICAL FIELD

The present invention relates to a manufacturing apparatus of a porous glass base material which is an original material for an optical fiber, and a glass base material for an optical fiber.

The present application incorporates herein the patent application identified below by reference, if applicable.

Japanese Patent Application No. 2004-78211 filed on Mar. 18, 2004

BACKGROUND ART

Figure 1:
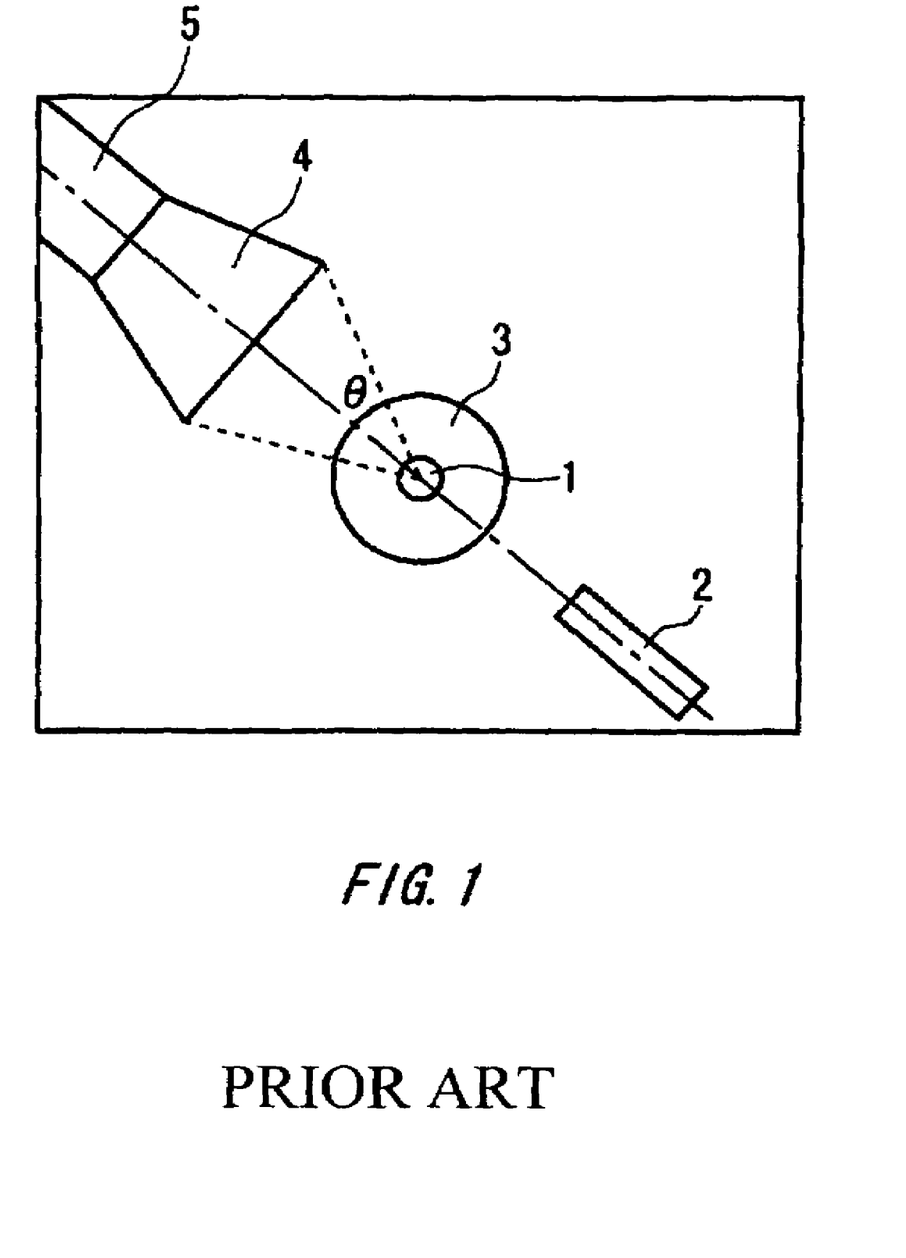
FIG. 1 is a vertical cross-sectional view schematically illustrating an example of a typical manufacturing apparatus of a porous glass base material.

FIG. 1 illustrates a typical manufacturing apparatus of a porous glass base material. In such a manufacturing apparatus, a base member glass rod 1 is axis-rotatably disposed, and a burner 2 is provided in a lower section. The burner 2 repeatedly moves back and forth reciprocates along the longitudinal direction of the base member glass rod 1, and ejects glass particles produced by flame hydrolysis onto the lateral surface of the base member glass rod 1. The glass particles are deposited sequentially in the longitudinal direction, thereby forming a porous glass soot 3.

Above the porous glass soot 3 are provided an exhaust hood 4 and an exhaust pipe 5 so as to oppose the burner 2. The exhaust hood 4 and exhaust pipe 5 are used to emit a combustion waste gas and unattached glass particles outside. Here, if the exhaust gas flow is disturbed within the apparatus some problems may occur. For example, the soot may break while the deposition is being performed, or a bubble may be created as a result of vitrification into a transparent glass because non-deposited glass particles are later deposited.

Figure 2:
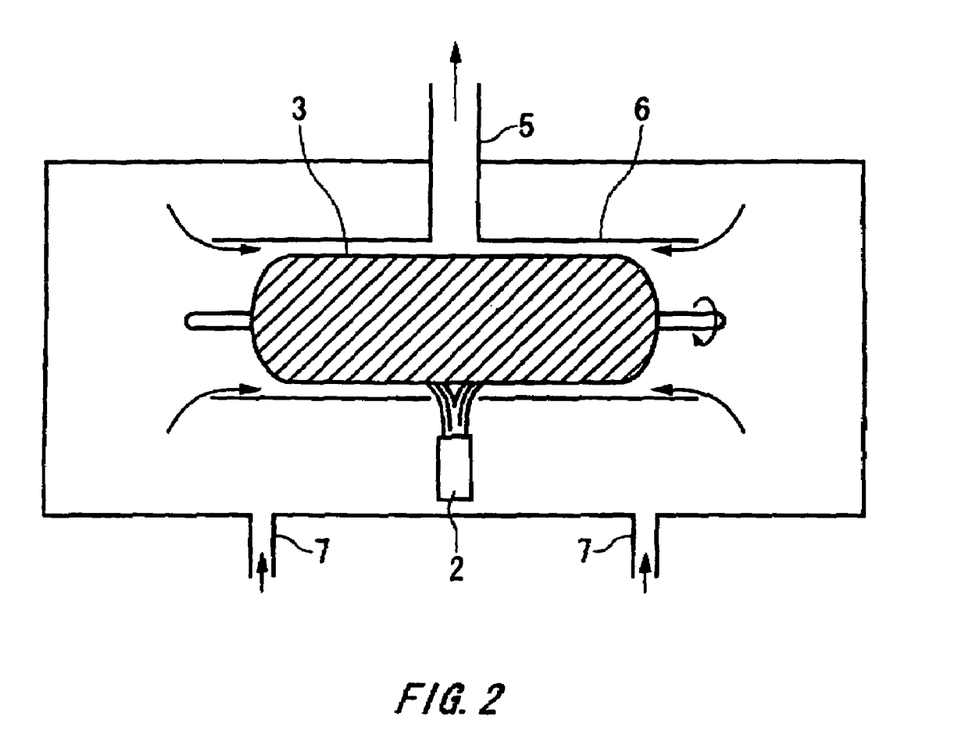
FIG. 2 is a vertical cross-sectional view schematically illustrating an example of a typical exhausting apparatus.

To deal with these problems, Patent Document 1 proposes the following method. The porous glass soot 3 is housed within a tubular member 6, and the exhaust pipe 5 is provided in substantially the middle of the tubular member 6. This enables the exhaust gas to flow in a direction along the longitudinal direction of the porous glass soot 3, thereby reducing bubbles. Here, the reference numeral 7 indicates a gas inlet (see FIG. 2).

[Patent Document 1] Unexamined Patent Application Publication No. S59-190232

DISCLOSURE OF THE INVENTION

Problems to be Solved by the Invention

In recent years, optical-fiber glass base materials of increasingly larger size have been developed, and porous glass soots, that is to say, the semi-finished products, accordingly grow in size. As the diameter of a porous glass soot increases, a flame flow becomes more disturbed when hitting against the deposition surface of the porous glass soot. Here, non-deposited glass articles, the linear velocity of which decreases, move upwards in the vertical direction and are not exhausted from the exhaust hood very well. Consequently, the gas flow is disturbed, which causes the following problems. For example, the soot may break, or bubbles may be created because the non-deposited glass particles are later deposited onto the porous glass soot.

An advantage of some aspects of the present invention is to provide a manufacturing apparatus of a porous glass base material and a glass base material for an optical fiber which can maintain an excellent exhaust gas flow even when a porous glass soot with a large diameter is manufacturing. Such a manufacturing apparatus and a glass base material can prevent a soot from breaking while deposition is being performed, and reduces bubbles which may be created as a result of vitrification into a transparent glass.

MEANS FOR SOLVING THE PROBLEMS

A first embodiment of the present invention is a manufacturing apparatus of a porous glass base material. The manufacturing apparatus includes a burner repeatedly moving back and forth reciprocating in a direction along a longitudinal direction of an axis-rotating base member glass rod, where the burner ejects and deposits glass particles onto the base member glass rod, and an exhaust hood positioned above a porous glass soot formed by the deposition of the glass particles, where the exhaust hood repeatedly moves back and forth reciprocates in a same direction as the burner in synchronization with the burner. Here, the exhaust hood surrounds a portion of the porous glass soot corresponding to an angle θ of 100° or more with respect to an axial centera central axis of the porous glass soot.

Here, the angle θ may be preferably 180° or more. Furthermore, the exhaust hood may be positioned so as to oppose the burner with the porous glass soot therebetween.

Here, the base material can be easily taken out in such a manner that a folding mechanism is provided on an upper surface of the exhaust hood to adjust the angle θ. In addition, the amount of non-deposited soot which grows on the end surface of the exhaust hood can be reduced in such a manner that an edge surface of an opening of the exhaust hood is formed by a curved surface.

A second embodiment of the invention is a manufcturing apparatus of a porous glass base material. The manufachtring apparatus includes a burner repeatedly moving back and forth reciprocating in a direction along a longitudinal direction of an axis-rotating base member glass rod, where the burner ejects and deposits glass particles onto the base member glass rod, and an exhaust hood positioned above a porous glass soot formed by the deposition of the glass particles, where the exhaust hood repeatedly moves back and forth reciprocates in a same direction as the burner in synchronization with the burner. Here, $0<r/R\leq1.5$, when r denotes an offset between (i) an extended line of a line connecting a central axis of the burner and an axial centera central axis of the porous glass soot (hereinafter simply referred to as a central axis line of the burner) and (ii) a central axis line of an exhaust pipe of the exhaust hood which is parallel to the extended line (hereinafter simply referred to as a central axis line of the exhaust pipe), and R denotes a radius of the exhaust pipe.

Here, the exhaust pipe may be positioned higher in a vertical direction.

A glass base material for an optical fiber relating to an aspect of the invention can be manufactured in such a manner that a porous glass base material is formed by using the manufacturing apparatus described above, and heated at a high temperature to be sintered and vitrified into a transparent glass.

Here, all the necessary features of the present invention are not listed in the summary of the invention. The sub-combinations of the features may become the invention.

EFFECT OF THE INVENTION

According to a first embodiment of the invention, an exhaust hood surrounds a portion of a porous glass soot corresponding to an angle θ of 100° or more. With this configuration, the flow of non-deposited glass particles and the exhaust gas flow are not disturbed and thus emitted outside excellently, not only when the diameter of the porous glass soot is still small at the beginning of the deposition process but also when the diameter becomes large at a later stage of the deposition process. Note that a large angle θ makes it difficult to take the porous glass soot out at the end of the deposition process. This drawback however, can be solved by providing a folding mechanism on the upper source of the exhaust hood.

According to a second embodiment of the invention, a ratio r/R is set to 1.5 or lower, when r denotes an offset between the central axis line of a burner and the central axis Line of an exhaust pipe and R denotes the radius of the exhaust pipe. With this configuration, a flame flow, the linear velocity of which decreases when the flow hits against a deposition surface, is excellently emitted outside together with non-deposited glass particles. Thus, the gas flow is not disturbed. As a result the soot does not break and the porous glass base material obtained does not include bubbles which may be created by later deposited non-deposited glass particles.

BRIEF DESCRIPTION OF THE DRAWINGS

FIG. 5 includes schematic cross-sectional views to illustrate the shape of an edge surface of an opening of an exhaust hood, where

BEST MODE FOR CARRYING OUT THE INVENTION

Hereinafter, the present invention will now be described through preferred embodiments. The embodiments do not limit the invention according to claims, and all the combinations of the features described in the embodiments are not necessarily essential to means for solving the problems of the invention.

Figure 3:
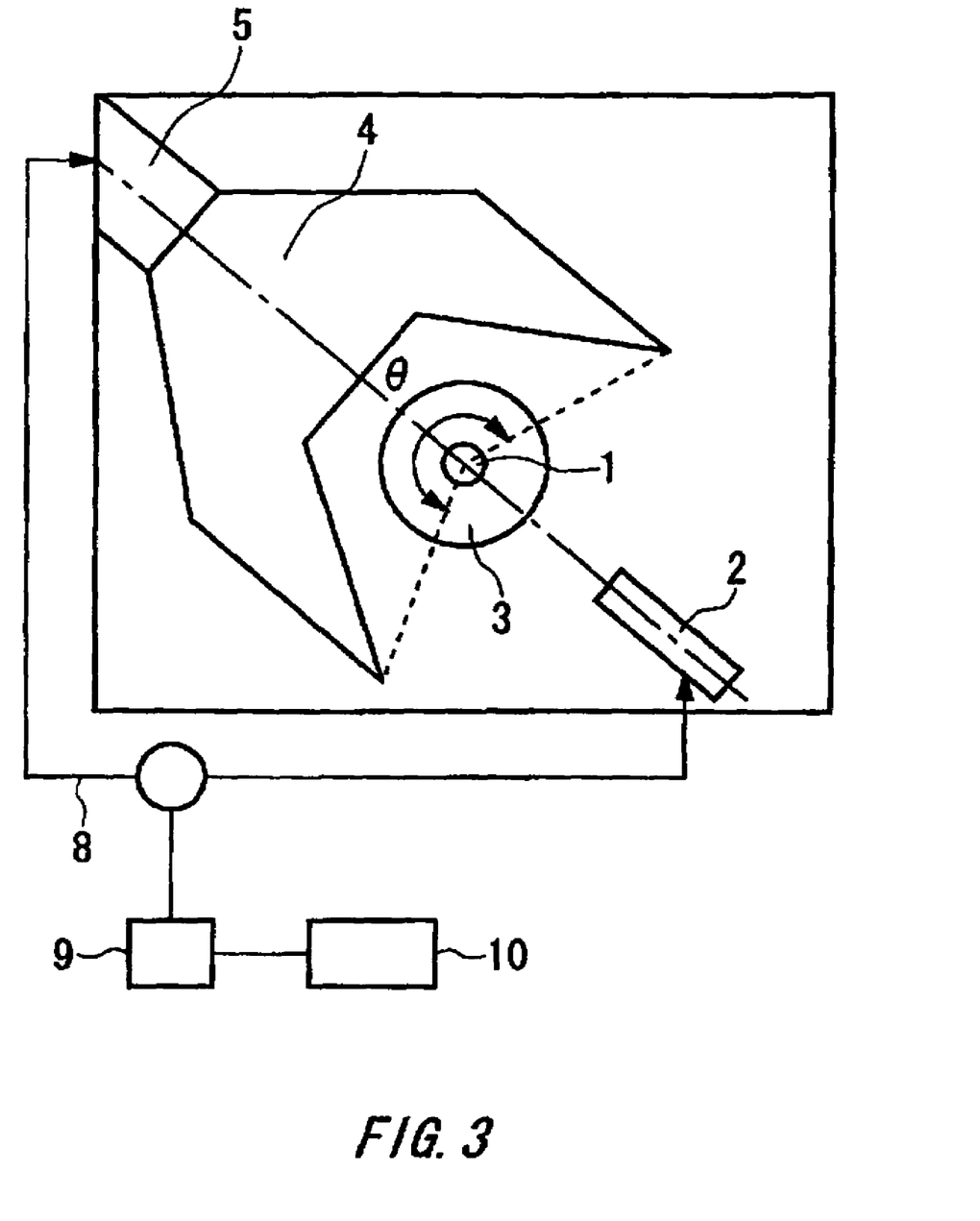
FIG. 3 is a vertical cross-sectional view schematically illustrating an example of a manufacturing apparatus of a porous glass base material, including an exhaust hood relating to a first embodiment of the invention.

FIG. 3 shows an example of a manufacturing apparatus relating to a first embodiment of the invention.

In the manufacturing apparatus a base member glass rod 1 is axis-rotatably disposed, a burner 2 for deposition of glass particles is provided, and an exhaust hood 4 is positioned so as to oppose the burner 2. Heel, the burner 2 and the exhaust hood 4 are supported so as to be able to move back and forth reciprocate in the same direction along the longitudinal direction of the base member glass rod 1 in synchronization with each other, by a movement control apparatus 10 via a screw rod 8 and a motor 9.

Onto the lateral surface of the base member glass rod 1, glass particles produced by subjecting a glass material to flame hydrolysis are deposited by means of the burner 2, so that a porous glass soot 3 is formed. Here, non-deposited glass particles am emitted outside, together with the exhaust gas, via the exhaust hood 4 which is positioned above the porous glass soot 3, and then the exhaust pipe 5. The exhaust hood is provided so as to surround a portion of the porous glass soot 3 corresponding to an angle θ of 100° or more with respect to the axial center the central axis of the porous glass soot 3.

The angle θ is increased so that the flame flow from the burner 2 is enclosed by the exhaust hood and excellently emitted without disturbing a nearby gas flow. According to this configuration, the flame flow is excellently emitted outside via the exhaust hood without disturbing a gas flow even when the porous glass soot 3 has a large diameter at a later stage of the deposition, as well as when the diameter of the porous glass soot 3 is still small at the beginning of the deposition. This can prevent non-deposited glass particles from being later deposited on the porous glass soot 3.

Figure 4A:
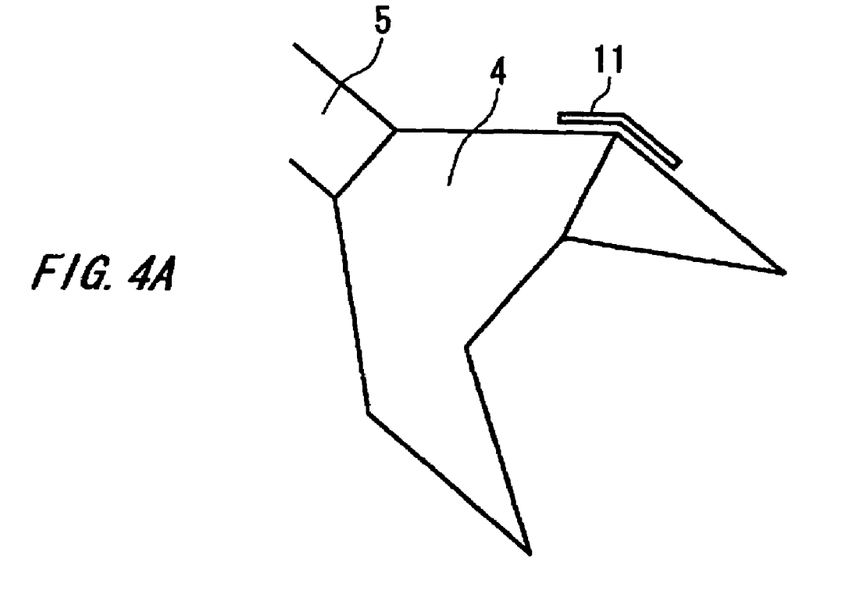
FIGS. 4A and 4B are schematic vertical cross-sectional views used to describe a folding mechanism provided on an upper surface of an exhaust hood relating to an aspect of the invention.
Figure 4B:
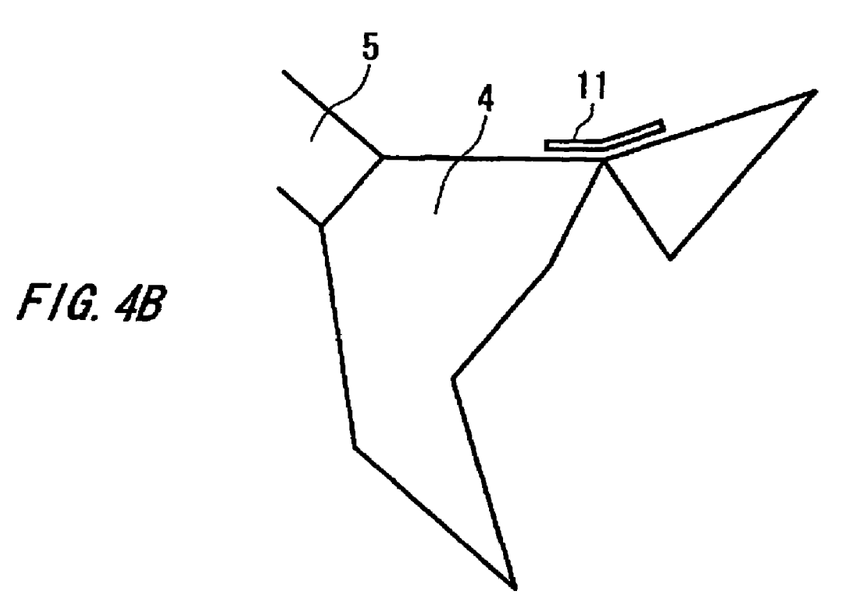

It should be noted that a lager angle θ makes it difficult to take out the porous glass soot 3 at the end of the deposition. Here, a folding mechanism 11 is provided on the upper surface of the exhaust hood 4 as shown in FIGS. 4A and 4B, to adjust the angle θ. According to this configuration, part of the exhaust hood 4 is folded upwards, so that the porous glass soot 3 is taken out without obstruction.

Figure 5A:
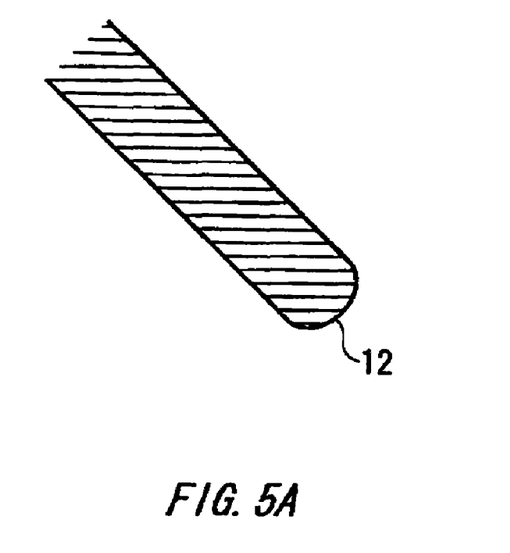
FIG. 5A shows a structure relating to an aspect of the invention and FIG. 5B shows a typical structure.
Figure 5B:
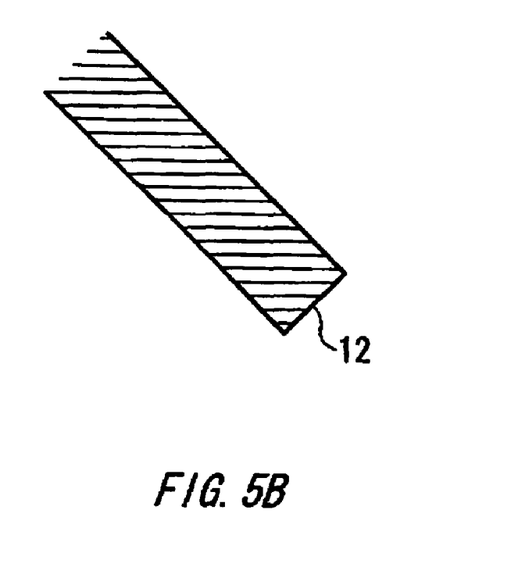

In addition, the edge surface 12 of the opening of the exhaust hood is curved as shown in FIG. 5A. With this configuration, the non-deposited glass particles are excellently guided to the exhaust hood, and a gas flow is not disturbed. FIG. 5B shows an edge surface 12 of an opening of a typical exhaust hood, which tends to cause disturbance in a gas flow.

Figure 6:
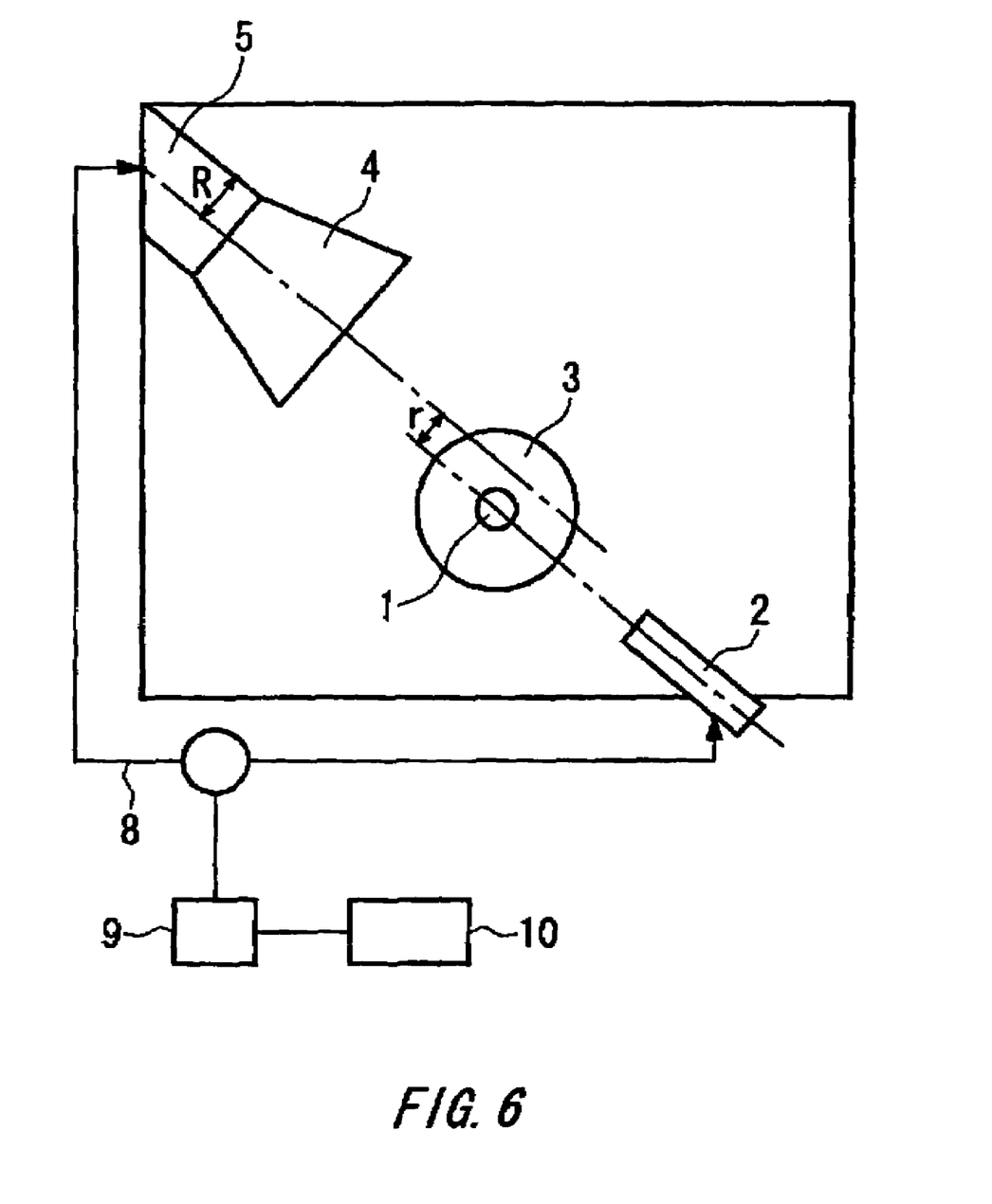
FIG. 6 is a vertical cross-sectional view schematically illustrating a relation between r and R, where r denotes an offset between the central axis line of a burner and the central axis line of an exhaust pipe and R denotes the radius of the exhaust pipe.

FIG. 6 illustrates a manufacturing apparatus relating to a second embodiment of the present invention. In the manufacturing apparatus, the burner 2 and the exhaust pipe 5 are arranged in such a manner that the central axis line of the burner 2, which is designed to run through the center of the base member glass rod 1, is positioned in parallel to the central axis line of the exhaust pipe 5. Furthermore, the manufacturing apparatus is configured to meet the condition of $0 < r/R \leq 1.5$, where r denotes an offset between the central axis line of the burner 2 and the central axis line of the exhaust pipe 5, and R denotes the radius of the exhaust pipe.

When the flame flow hits against the deposition surface, the linear velocity of the flame flow decreases. With the above-described configuration, however, the flame flow can be excellently emitted outside together with non-deposited glass particles. Accordingly, the gas flow is not disturbed. As a result, the breakage of the soot can be avoided, and the manufacturing apparatus can provide a porous glass base material which does not include a bubble attributable to the luer deposition of the non-deposited glass particles.

IMPLEMENTATION EXAMPLES

The following describes some aspects of the present invention in more detail with reference to examples implementation and comparative examples. Note that, however, the invention is not limited to these examples, and may include a variety of other embodiments.

Implementation Example 1

A porous glass base material was manufactured with the use of the manufacturing apparatus shown in FIG. 3.

The burner 2 and the exhaust pipe 5 within the apparatus are repeatedly moved back and forth reciprocated by means of the screw rod 8 and the motor 9. A glass material is supplied to the burner 2 and subjected to flame hydrolysis so that glass particles are produced, and the produced glass particles are ejected onto the lateral surface of the stating base member glass rod 1. The burner 2 is coupled to a combustible gas supply pipe, a supporting gas supply pipe, and a material gas supply pipe (all not shown).

The burner 2 is supplied with a hydrogen gas as a combustible gas and an oxygen gas as a supporting gas, to generate a flame flow. In addition, the burner 2 is provided with a tetrachlorosilane gas as a material gas, so that glass particles are produced as a result of flame hydrolysis. Here, the base member glass rod 1 may be formed by a quartz glass, or a core rod including a core portion and a clad portion.

The non-deposited glass particles and exhaust gas are emitted outside via the exhaust hood 4 and then the exhaust pipe 5. The exhaust hood 4 is provided so as to surround a portion of the porous glass soot 3 corresponding to an angle θ of 110° with respect to the axial center the central axis of the base member glass rod 1.

The glass particle deposition was performed in the above-described manufacturing apparatus by supplying the material gas to the burner 2. In this case, the gas flow was not disturbed, and the non-deposited glass particles and exhaust gas were emitted through the exhaust hood 4 even when the diameter of the porous glass soot became large at a later stage of the deposition. Consequently, the soot did not break and the non-deposited glass particles were not later deposited onto the porous glass soot.

Comparative Example 1

Glass particle deposition was performed under the same conditions as in the implementation example 1, except that the angle θ was set to 90°.

The exhaust was excellently performed at an early stage of the deposition as long as the diameter of the porous glass soot 3 was small. However, as the diameter of the porous glass soot 3 became larger as a result of the deposition, the flame flow hitting again the deposition surface caused more disturbance in the gas flow. Accordingly, the flame flow, the linear velocity of which decreases and which includes the non-deposited glass particles, moved upwards in the vertical direction. As a result, the exhaust of the flame flow via the exhaust hood 4 became less smooth. For this reason, the non-deposited glass particles were later deposited onto the soot and bubbles were created when the porous glass base material was vitrified into a transparent glass.

Implementation Example 2

A porous glass base material was manufactured with the use of the manufacturing apparatus shown in FIG. 6.

The offset between the central axis line of the exhaust pipe 5 and the central axis line of the burner 2 was set to 0.5-, 1.0-, and 1.5-fold larger than the radius R of the exhaust pipe, in such a manner that the central axis line of the exhaust pipe 5 was positioned higher in the vertical direction. Under these conditions, glass particles were deposited onto the base member glass rod 1. Even though the linear velocity of the flame flow hitting against the deposition surface deceased, the flame flow was excellently emitted outside together with non-deposited glass particles. As a result, the gas flow was not disturbed under each of the conditions. Accordingly, the soot did not break, and the porous glass base material manufactured by the manufcturing apparatus did not have a bubble which can be created if the non-deposited glass particles are later deposited.

Comparative Example 2

Glass particle deposition was performed under the same conditions as in the implementation example 2, except that the offset between the central axis line of the exhaust pipe 5 and the central axis line of the burner 2 was set to 2.0-fold larger than the radius R of the exhaust pipe. When the flame flow hit against the deposition surface, the non-deposited glass particles that moved towards the upper side of the base material were excellently emitted outside, but the non-deposited glass particles that moved towards the lower side of the base material could not be emitted very well. Therefore, the non-deposited glass particles were later deposited, and a bubble was created.

While the present invention has been described with the embodiments, the technical scope of the invention is not limited to the above-described embodiments. The embodiments may be modified or improved in many different ways. It is apparent to persons skilled in the art from the claims that such modifications or improvements can be included in the technical scope of the invention.

INDUSTRIAL APPLICABILITY

According to some aspects of the invention, a soot is prevented from breaking while glass particles are being deposited, and only few bubbles are created as a result of vitrification into a transparent glass. Thus, a high-quality glass base material for an optical fiber can be provided at a low cost.

The invention claimed is:

1. A manufacturing apparatus for a porous glass base material, comprising:
    a burner repeatedly reciprocating in a direction along a longitudinal direction of an axially rotating base member glass rod, the burner ejecting and depositing glass particles onto the base member glass rod; and
    an exhaust hood positioned above a porous glass soot formed by the deposition of the glass particles, the exhaust hood repeatedly reciprocating in the same direction as the burner and in synchronization with the burner,
    wherein the exhaust hood surrounds a portion of the porous glass soot such that an angle θ of 100° or more of a cross section of the porous glass soot perpendicular to a central axis of the porous glass soot is surrounded.

2. The manufacturing apparatus according to claim 1, wherein the angle θ is 180° or more.

3. The manufacturing apparatus according to claim 2, wherein an edge surface of an opening of the exhaust hood is formed by a curved surface.

4. The manufacturing apparatus according to claim 1, wherein the exhaust hood is positioned to oppose the burner, and
    wherein the porous glass soot is provided between the exhaust hood and the burner.

5. The manufacturing apparatus according to claim 4, wherein an edge surface of an opening of the exhaust hood is formed by a curved surface.

6. The manufacturing apparatus according to claim 1, wherein a folding mechanism is provided on an upper surface of the exhaust hood to adjust the angle θ.

7. The manufacturing apparatus according to claim 6, wherein an edge surface of an opening of the exhaust hood is formed by a curved surface.

8. The manufacturing apparatus according to claim 1, wherein an edge surface of an opening of the exhaust hood is formed by a curved surface.

9. A manufacturing apparatus of a porous glass base material, comprising:
    a burner repeatedly reciprocating in a direction along a longitudinal direction of an axis-rotating base member glass rod, the burner ejecting and depositing glass particles onto the base member glass rod; and
    an exhaust hood positioned above a porous glass soot formed by the deposition of the glass particles, the exhaust hood repeatedly reciprocating in the same direction as the burner and in synchronization with the burner, wherein $0.5 < r/R \leq 1.5$, when r denotes an offset between (i) an extended line of a line connecting a central axis of the burner and a central axis of the porous glass soot and (ii) a central axis line of an exhaust pipe of the exhaust hood which is parallel to the extended line, and R denotes a radius of the exhaust pipe.

10. The manufacturing apparatus according to claim 9, wherein the exhaust pipe has a position that is higher in a vertical direction than a position of the burner.

11. A porous glass base material manufacturing apparatus, comprising:
    an axially rotating base member glass rod;
    a porous glass soot disposed on an outer circumference of said base member glass rod;
    a burner repeatedly reciprocating in a direction along a longitudinal direction of said base member glass rod; and
    an exhaust hood disposed above said porous glass soot, said exhaust hood repeatedly reciprocating in the same direction as said burner and synchronized with said burner,
    wherein a cross section of said porous glass soot that is perpendicular to a central axis of said porous glass soot is surrounded by said exhaust hood at an angle θ of 100° or greater.

12. The manufacturing apparatus according to claim 11, further comprising:
    an exhaust pipe attached to a portion of said exhaust hood facing away from said porous glass soot,
    wherein $0.5 < r/R \leq 1.5$, where r is an offset between (i) an extended line of a line connecting a central axis of said burner and said central axis of the porous glass soot and (ii) a central axis line of said exhaust pipe which is parallel to said extended line, and R is a radius of said exhaust pipe.

13. The manufacturing apparatus according to claim 11, further comprising:
    an exhaust pipe attached to a portion of said exhaust hood facing away from said porous glass soot,
    wherein said exhaust hood comprises a folding mechanism provided on a surface of said exhaust hood, said folding mechanism being able to fold away from said porous glass soot toward said exhaust pipe.

* * * * *